United States Patent
Oh et al.

(10) Patent No.: US 7,522,345 B2
(45) Date of Patent: Apr. 21, 2009

(54) METHOD OF FABRICATING LIQUID LENS USING ELECTROWETTING AND LIQUID LENS FABRICATED THEREBY

(75) Inventors: Byung Do Oh, Gyunggi-Do (KR); Young Kyu Park, Gyunggi-Do (KR); Sun Ok Kim, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 80 days.

(21) Appl. No.: 11/638,586

(22) Filed: Dec. 14, 2006

(65) Prior Publication Data

US 2007/0146895 A1 Jun. 28, 2007

(30) Foreign Application Priority Data

Dec. 27, 2005 (KR) .................. 10-2005-0130642

(51) Int. Cl.
 *G02B 1/06* (2006.01)
(52) U.S. Cl. .................. 359/665; 359/666; 349/193; 349/200
(58) Field of Classification Search .................. 359/665, 359/666; 349/193, 200
 See application file for complete search history.

(56) References Cited

U.S. PATENT DOCUMENTS 7,242,528 B2 * 7/2007 Renders et al. ............. 359/665

2004/0218283 A1 11/2004 Nagaoka et al.
2005/0002113 A1 1/2005 Berge

FOREIGN PATENT DOCUMENTS

| JP | 2003-57410 | 2/2003 |
| WO | 2004/099847 | 11/2004 |

OTHER PUBLICATIONS

Korean Office Action, dated Nov. 24, 2006 from the Korean Intellectual Property Office.
Extended European Search Report issued in corresponding European Patent Application No. 06256489.3-1234, mailed on May 22, 2007.
B. Berge et al. "Variable Focal Lens Controlled by an External Voltage: An Application of Electrowetting", European Physical Journal E. Soft Matter, EDP Sciences, IT, vol. 3, No. 2, Oct. 2000, pp. 159-163.

* cited by examiner

*Primary Examiner*—Joseph Martinez

(57) ABSTRACT

A method of fabricating a liquid lens which can prevent unstable movement of liquids while sealing a hole containing the liquids by applying voltage to a chamber containing the liquids to induce electrowetting, and a liquid lens fabricated thereby. The method includes providing a chamber with a hole formed therein for containing liquid and injecting two non-miscible liquids with different refractive indices. The method also includes placing a conductive transparent plate to be in contact with the liquid on the top and applying voltage to the conductive transparent plate and the chamber to induce electrowetting, thereby changing the shape of meniscus between the two liquids. The method further includes covering an upper surface of the chamber with the conductive transparent plate to seal the hole.

4 Claims, 3 Drawing Sheets

METHOD OF FABRICATING LIQUID LENS USING ELECTROWETTING AND LIQUID LENS FABRICATED THEREBY

CLAIM OF PRIORITY

This application claims the benefit of Korean Patent Application No. 2005-130642 filed on Dec. 27, 2005, in the Korean Intellectual Property Office, the disclosure of which is incorporated herein by reference.

BACKGROUND OF THE INVENTION

1. Field of the Invention

The present invention relates to a method of fabricating a liquid lens containing at least two liquids and a liquid lens fabricated thereby, and more particularly, to a method of fabricating a liquid lens which applies voltage to a chamber containing liquids to induce electrowetting, thereby preventing unstable movement of the liquids when sealing a hole containing the liquids, and a liquid lens fabricated thereby.

2. Description of the Related Art

A general lens module uses lenses manufactured with solid material such as glass at a fixed focal distance. In such a lens module, a plurality of solid lenses are provided and the distance of each lens is adjusted to control the focus. Thus, such a lens module is limited in miniaturization and requires a complicated operation to adjust focus.

To overcome such problems, there has been proposed a liquid lens which is configured to adjust the focus by varying the curvature of meniscus between the different liquids. This liquid lens has a simple internal configuration to facilitate miniaturization and to more easily adjust the focus.

Since the researches on the liquid lens utilizing electrowetting have gained attention in early 2000, various applications have been introduced, and efforts for its industrialization have been accelerated. In general, liquid lenses have advantages such as small size, low power consumption, prompt response rate and good reproducibility. Therefore, auto-focusing modules for cameras mounted to mobile phones, PDAs and the like have continued to be actively developed.

A conventional method of fabricating a liquid lens will now be explained hereunder with reference to the accompanying drawings.

FIG. 1 is a sectional view illustrating a conventional method of fabricating a liquid lens, in which liquid is filled in a hole inside a chamber, FIG. 2 is a sectional view illustrating the conventional method of fabricating a liquid lens, in which an upper transparent plate is in contact with electrolyte, and FIG. 3 is a sectional view illustrating the conventional method of fabricating a liquid lens in which the upper transparent plate is attached to an upper surface of the chamber to seal the hole.

The conventional method of fabricating the liquid lens is as follows in detail.

First, as shown in FIG. 1, a chamber 100 having an inner wall to form a hole 110 with a circular section is provided. The lower surface of the hole 110 is sealed by a lower transparent plate 120, and thus the lower transparent plate 120 and the chamber 100 are bonded to each other by a bonding layer (not shown). In addition, a hydrophobic insulation film is coated on an inner wall of the hole 110 to allow the operation of the liquid lens.

When the chamber 100 is provided, two non-miscible liquids 300 and 400 are filled in the hole 110. At this time, these two liquids are provided in substantially the same proportions but have different refractive indices. One is conductive while the other one is non-conductive. In general, the liquid on the top is electrolyte 300 having conductivity whereas the liquid at the bottom is insulation liquid 400 having non-conductivity.

When the liquids are filled in the hole 110, the electrolyte 300 at the top tends to dewet to an inner wall of the hole 110 whereas the insulation liquid 400 tends to wet an inner wall of the hole 110. At this time, due to affinity difference between the two liquids and an insulation film formed on an inner wall of the hole 110, the insulation liquid 400 wetting the inner wall of the hole 110 tends to enclose the electrolyte 300 as shown in FIG. 1. That is, the meniscus between the electrolyte 300 and the insulation liquid 400 has a concave central portion.

In addition, the upper surface of the electrolyte 300 filled in the hole 110 has an upwardly-convexed shape due to surface tension. And when the upper transparent plate 500 attached to an upper surface of the chamber 100 comes in contact with the electrolyte 300, the electrolyte 300 adheres to an undersurface of the upper transparent plate 500 due to mutual attraction, as shown in FIG. 2.

When the electrolyte 300 adheres to an undersurface of the upper transparent plate 500 as described above, the insulation liquid 400 is also pulled toward the upper transparent plate 500 and its peripheral portion is positioned near an upper opening of the hole 110. In this state, when the upper transparent plate 500 is attached to an upper end of the chamber 100, the electrolyte 300 leaks between an upper surface of the chamber 100 and an undersurface of the upper transparent plate 500, and the insulation liquid 400 also is pulled along with the electrolyte 300 to leak between an upper surface of the chamber 100 and an undersurface of the upper transparent plate 500. The leakage of the electrolyte 300 and the insulation liquid 400 as described above may cause optical and operational problems of the lens, degrade the sealing state of the liquids and cause bubbles to be formed inside the hole 110. The bubble formation in the hole 110 hinders maintenance of a regulated level of refractive index of light, thus fatally impairing the normal function of the lens.

Besides the problematic bubble formation in the hole 110, when the upper transparent plate 500 is attached, if the insulation liquid 400 wraps around the entire inner surface of the hole 110 as shown in FIG. 3, current is not applied to the electrolyte 300 even with voltage application, impeding electrowetting. Without the electrowetting, the meniscus between the electrolyte 300 and the insulation liquid 400 is not changed, making it impossible to adjust focus.

In addition, when desired to inject additional liquid before finally attaching the upper transparent plate 500, additional injection of liquid into the hole in a state depicted in FIG. 2 results in leakage of a peripheral portion of the insulation liquid to the outside, due to the pressure of the liquid being additionally injected.

To overcome such a problem, the hole 110 should be formed deeper, which entails increased thickness of the chamber 100, resulting in an increased overall size of the liquid lens.

SUMMARY OF THE INVENTION

The present invention has been made to solve the foregoing problems of the prior art and therefore an aspect of the present invention is to provide a method of fabricating a liquid lens which stably seals liquid without leakage of insulation liquid or change in meniscus, maintains a contact state of the electrolyte and the chamber to stably induce electrowetting and reduces an overall size of the liquid lens, and to a liquid lens fabricated thereby.

According to an aspect of the invention, a method of fabricating a liquid lens includes: providing a chamber with a hole formed therein for containing liquid; injecting two liquids in a stacked structure, the two liquids being non-miscible and having different refractive indices; placing a conductive transparent plate to be in contact with the liquid on the top; applying voltage to the conductive transparent plate and the chamber to induce electrowetting, thereby changing the shape of meniscus between the two liquids; covering an upper surface of the chamber with the conductive transparent plate to seal the hole.

Of the two liquids, the liquid disposed on the top is electrolyte and the liquid disposed at the bottom is insulation liquid The step of applying voltage causes the meniscus of the two liquids to be horizontally flat or upwardly convexed with a lower peripheral portion.

In addition, the exemplary method further includes additionally injecting at least one of the liquids in the hole after inducing electrowetting to alter the shape of the meniscus.

According to an aspect of the invention for realizing the object, there is provided a liquid lens including: a chamber having an inner wall to provide a hole for containing liquid; two liquids in a stacked structure, which are non-miscible and have different refractive indices; and a conductive transparent plate for covering the upper surface of the chamber to seal the hole.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
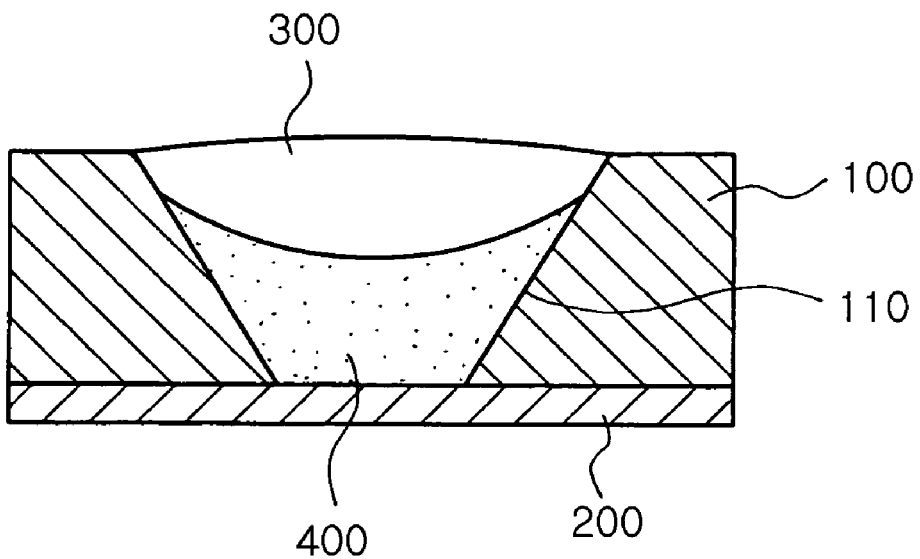
FIG. 1 is a sectional view illustrating a conventional method of fabricating a liquid lens, in which liquids are filled in a hole of a chamber.

Exemplary embodiments of the present invention will now be described in detail with reference to the accompanying drawings.

A method of fabricating a liquid lens according to the present invention first starts with providing a chamber 100 including a hole 110 therein having a circular section, with a lower transparent plate 200 attached to a bottom thereof to seal a lower surface of the hole 110, and filling non-miscible two liquids, i.e., electrolyte 300 and insulation liquid 400 inside the hole 110.

It is preferable that an insulation film (not shown), which is coated on the inner wall of the hole 110 for operation of the liquid lens, is coated with a dielectric material without pinholes such as parylene, and that the insulation film has such a coating thickness that it does not break down when the voltage is applied to obtain an optically desirable range of results. In this embodiment, the thickness of the coating is set at 2.5 µm.

The hole 110 has a circular horizontal section so that the meniscus between the electrolyte 300 and the insulation liquid 400 (hereinafter, referred to as 'the meniscus') has a uniform sag. In addition, according to the characteristics of the electrolyte 300 and the insulation liquid 400, the meniscus maintains a predetermined contact angle with an inner wall of the hole 110. Here, if the hole 110 has a cylindrical shape, the meniscus has a steeply upwardly inclined peripheral portion so that the total height of the meniscus, i.e., the distance from the peripheral portion to the central portion of the meniscus becomes too large. Thus, the hole 110 has an inclined inner wall to have a section decreasing toward a bottom thereof. With the inclined inner wall of the hole 110, the meniscus has a decreased slope of the peripheral portion, resulting in the decreased total height of the meniscus, thereby achieving miniaturization of the chamber 100.

The procedures of providing the chamber 100 of such a structure and filling in the electrolyte 300 and the insulation liquid 400 are identical to those in the conventional method of fabricating a liquid lens, and thus additional explanation is omitted.

Figure 4:
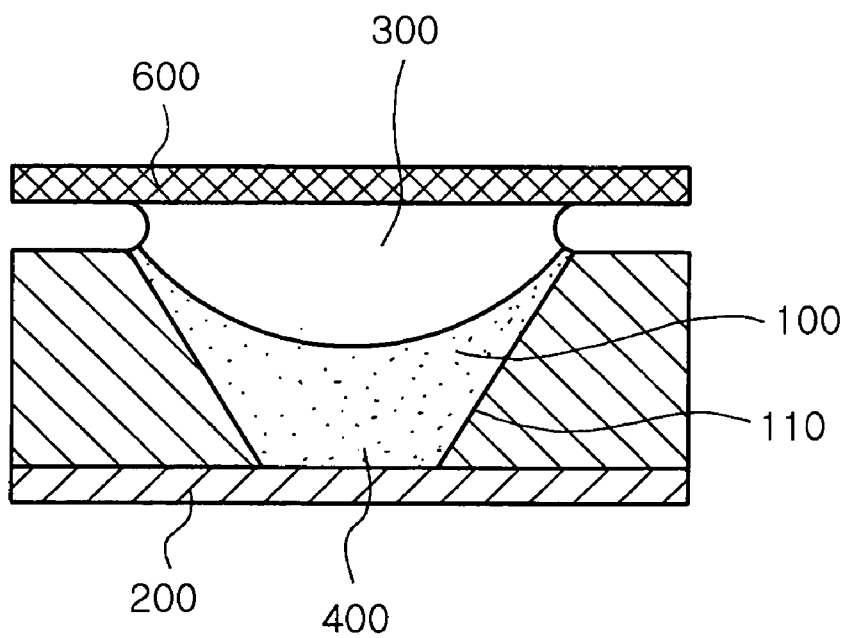
FIG. 4 is a sectional view illustrating the exemplary method of fabricating a liquid, in which an upper transparent plate is attached to contact electrolyte.
Figure 5:
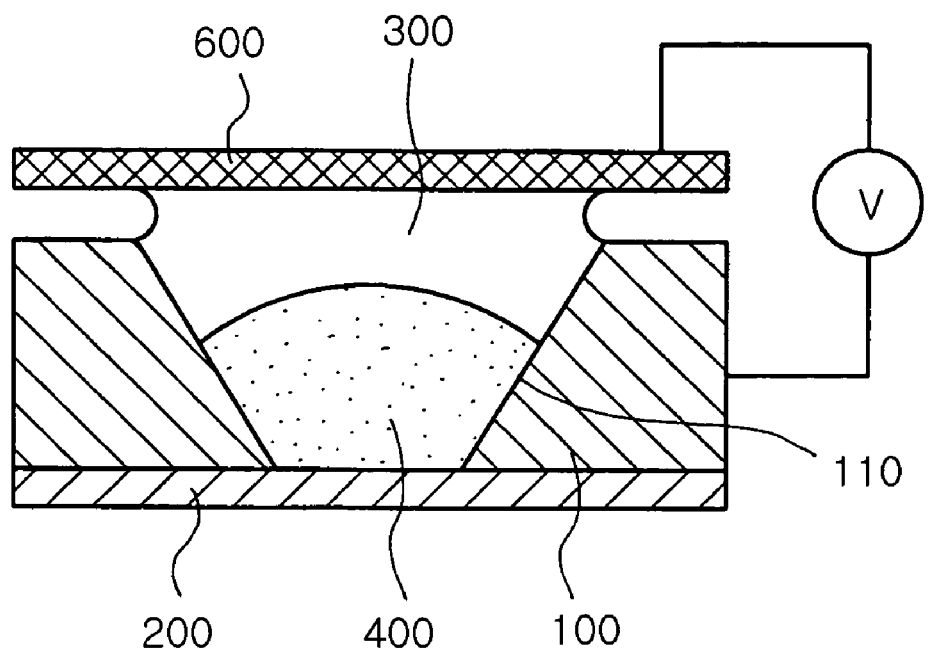
FIG. 5 is a sectional view illustrating the exemplary method of fabricating a liquid lens, in which voltage is applied to the upper transparent plate and a chamber to induce electrowetting.

FIG. 4 is a sectional view illustrating the exemplary method of fabricating a liquid lens, in which the conductive transparent plate is attached to contact the electrolyte, and FIG. 5 is a sectional view illustrating the exemplary method of fabricating a liquid lens, in which voltage is applied to the conductive transparent plate and the chamber to induce electrowetting.

Figure 2:
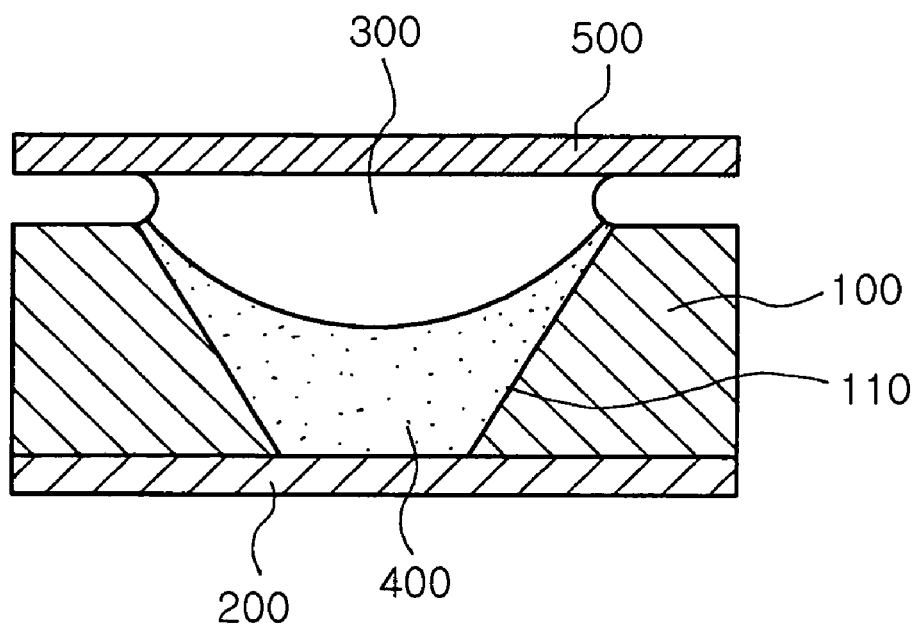
FIG. 2 is a sectional view illustrating the conventional method of fabricating a liquid lens, in which an upper transparent plate is attached to contact electrolyte.
Figure 3:
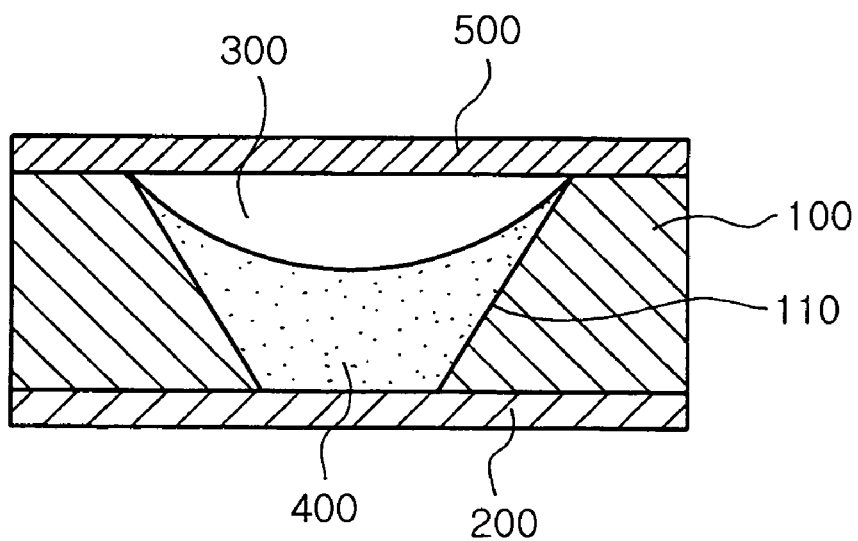
FIG. 3 is a sectional view illustrating the conventional method of fabricating a liquid lens, in which the upper transparent plate is attached to an upper surface of the chamber to seal the hole of the chamber.

When the conductive transparent plate 600 is placed to contact an upper surface of the electrolyte 300, i.e., to be attached to an upper surface of the chamber 100, the electrolyte 300 adheres to the conductive transparent plate 600 as shown in FIG. 4, and the insulation liquid 400 also is pulled toward the upper transparent plate 500 with its peripheral portion positioned near an upper opening of the hole 110, as in the conventional method shown in FIG. 2.

In this state, when the conductive transparent plate 500 is tightly attached to an upper surface of the chamber 100 to seal the hole 110, the electrolyte 300 leaks out of the hole 110 and a portion of the insulation liquid 400 leaks along with the electrolyte 400, out of the hole 110. The leakage of the electrolyte 300 and the insulation liquid 400 may cause bubbles to be formed or the meniscus of the electrolyte 300 and the insulation liquid 400 to be moved toward the inner wall. Even if appropriate amounts of the electrolyte 300 and the insulation liquid 400 are injected by calculating the various conditions including the dimension of the inner space, the leakage of the electrolyte 300 and the insulation liquid 400 may occur in the subsequent fabrication processes.

To prevent such a problem, the exemplary method of fabricating the liquid lens includes applying voltage to the chamber 100 and the conductive transparent plate 500 to vary the meniscus between the electrolyte 300 and the insulation liquid 300 by electrowetting, as shown in FIG. 5.

When voltage is applied to the chamber 100 and conductive transparent plate 600, the meniscus has a lower peripheral portion, i.e., a sag with an upwardly-convexed central portion thereof, due to electrowetting.

At this time, the degree of the peripheral portion being lowered is determined by the magnitude of the voltage applied to the chamber 100 and the conductive transparent plate 600. That is, before the voltage is applied to the chamber 100 and the conductive transparent plate 600, the peripheral portion of the meniscus rises along the inner wall of the hole 110, but as the voltage is increased, the peripheral portion of the meniscus comes down along the inner wall of the hole 110.

To make the peripheral portion of the meniscus come down, the magnitude of the voltage applied to the conductive transparent plate 600 and the chamber 100 is determined according to the thickness of the insulation film. For example, in a case where the insulation film has a thickness of about 5 μm, it is preferable that the voltage applied to the conductive transparent plate 600 and the chamber 100 is set at 60V or higher. With such voltage applied, the meniscus has a lower peripheral portion than a central portion, i.e., an upwardly-convexed central portion, as shown in FIG. 5. With an upwardly-convexed central portion of the meniscus, the electrolyte 300 and the insulation liquid 400 have more stable operation of adjusting the focal distance in response to variation of the voltage application.

Here, the electrowetting is identical to the conventional one which causes change of the meniscus of the electrolyte 300 and the insulation liquid 400, and thus additional explanation is omitted.

In addition, the exemplary method of fabricating a liquid lens may further include additionally injecting the electrolyte 300 or the insulation liquid 400 into the hole 110 while the electrolyte 300 contacting an undersurface of the conductive transparent plate 600 and the meniscus forming a lower peripheral portion due to electrowetting, as shown in FIG. 5.

In the conventional method of fabricating a liquid lens, when the electrolyte 300 or the insulation liquid 400 is injected into the hole 110 while the electrolyte 300 is contacting an undersurface of the upper transparent plate, the insulation liquid 400 may leak out of the hole 110 through a periphery of the hole 110. However, according to the exemplary method of fabricating a liquid lens, as the meniscus has a sag with a lower peripheral portion, even if the electrolyte 300 or the insulation liquid 400 is additionally injected into the hole 110, the insulation liquid 400 does not leak out of the hole 110.

As additional injection of the electrolyte 300 or the insulation liquid 400 is possible as described above, the amount of each liquid 300 or 400 can be modified in the middle of the fabrication process of a liquid lens.

Figure 6:
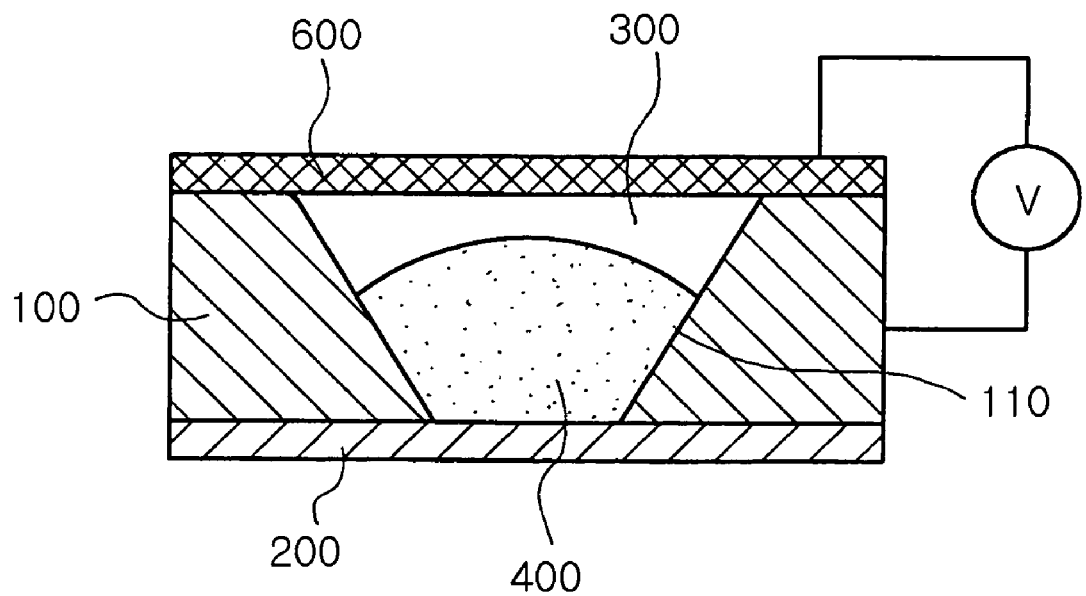
FIG. 6 is a sectional view illustrating the exemplary method of fabricating a liquid lens, in which the upper transparent plate is attached to an upper surface of the chamber to seal the hole of the chamber.

FIG. 6 is a sectional view illustrating the exemplary method of fabricating a liquid lens, in which the conductive transparent plate is attached to an upper surface of the chamber to seal the hole.

In the state illustrated in FIG. 5, as the conductive transparent plate 600 is tightly attached to an upper surface of the chamber 100 to seal the hole 110, regardless of the pressure or vibration transmitted to the liquids 300 and 400 in the hole 110, the insulation liquid 400 maintains a sag with a lower peripheral portion in response to the voltage applied to the chamber 100 and the conductive transparent plate 600, as shown in FIG. 6. This reduces the possibility of the liquids leaking out of the hole 110.

Therefore, according to the exemplary method of fabricating a liquid lens, the hole 110 does not have to be formed in a great depth to prevent the leakage of the insulation liquid 400 in the process of sealing the hole 110, thus resulting in a liquid lens with a reduced overall thickness.

In addition, according to the exemplary method of fabricating a liquid lens, the possibility of leakage of the electrolyte 300 and insulation liquid 400 can be decreased, allowing more stable fabrication of the liquid lens, thereby improving productivity. Moreover, according to the exemplary method of fabricating a liquid lens, the liquid lens can advantageously maintain a contact state of the electrolyte 300 and the chamber 100 even after the hole 110 is finally sealed by the conductive transparent plate 600.

According to the exemplary method of fabricating a liquid lens, a meniscus forms a sag with a lower peripheral portion due to electrowetting to stably seal liquids without leakage of insulation liquid or deformation of meniscus. Moreover, the exemplary method allows electrolyte and a chamber to maintain a contact state with each other, stably inducing electrowetting. Further, the exemplary method allows a decreased depth of a hole containing the electrolyte and the insulation liquid to reduce an overall size of the liquid lens.

In addition, the exemplary method of fabricating a liquid lens reduces the possibility of leakage of liquids filled in the hole to more stably fabricate a liquid lens, thereby improving productivity.

Furthermore, a liquid lens according to the present invention has a smaller thickness than the conventional liquid lens, realizing miniaturization of a final product adopting the liquid lens.

While the present invention has been shown and described in connection with the preferred embodiments, it will be apparent to those skilled in the art that modifications and variations can be made without departing from the spirit and scope of the invention as defined by the appended claims.

What is claimed is:

1. A method of fabricating a liquid lens comprising:
   providing a chamber with a hole formed therein for containing liquid;
   injecting two liquids in a stacked structure, the two liquids being non-miscible and having different refractive indices;
   placing a conductive transparent plate to be in contact with the liquid on the top;
   applying voltage to the conductive transparent plate and the chamber to induce electrowetting, thereby changing the shape of meniscus between the two liquids;
   covering an upper surface of the chamber with the conductive transparent plate to seal the hole after the applying voltage to the conductive transparent plate and the chamber.

2. The method according to claim 1, wherein the applying voltage causes the meniscus of the two liquids to be horizontally flat or upwardly convexed with a lower peripheral portion.

3. A method of fabricating a liquid lens comprising:
   providing a chamber with a hole formed therein for containing liquid;
   injecting two liquids in a stacked structure, the two liquids being non-miscible and having different refractive indices;

placing a conductive transparent plate to be in contact with the liquid on the top;

applying voltage to the conductive transparent plate and the chamber to induce electrowetting, thereby changing the shape of meniscus between the two liquids;

additionally injecting at least one of the liquids in the hole after inducing electrowetting; and covering an upper surface of the chamber with the conductive transparent plate to seal the hole.

4. The method according to claim 3, wherein the applying voltage causes the meniscus of the two liquids to be horizontally flat or upwardly convexed with a lower peripheral portion.

* * * * *